US011854048B1

(12) United States Patent
Haley et al.

(10) Patent No.: US 11,854,048 B1
(45) Date of Patent: Dec. 26, 2023

(54) SYSTEM AND METHOD FOR CONTROLLING REAL-TIME BIDDING FOR ONLINE ADVERTISEMENTS

(71) Applicant: Valassis Digital Corp., Morrisville, NC (US)

(72) Inventors: Ben Haley, Austin, TX (US); Michael Els, Cambridge, MA (US); Damien Harris, Austin, TX (US); Christopher Farmer, Austin, TX (US); Kurt Carlson, Austin, TX (US)

(73) Assignee: Valassis Digital Corp., San Antonio, TX (US)

( * ) Notice: Subject to any disclaimer, the term of this patent is extended or adjusted under 35 U.S.C. 154(b) by 67 days.

(21) Appl. No.: 17/114,364

(22) Filed: Dec. 7, 2020

Related U.S. Application Data

(63) Continuation of application No. 15/354,536, filed on Nov. 17, 2016, now Pat. No. 10,861,057, which is a continuation of application No. 13/750,960, filed on Jan. 25, 2013, now Pat. No. 9,501,789, which is a continuation-in-part of application No. 13/565,710, filed on Aug. 2, 2012, now abandoned.

(51) Int. Cl.
*G06Q 30/0273* (2023.01)
*G06Q 30/0272* (2023.01)
*G06Q 30/0242* (2023.01)

(52) U.S. Cl.
CPC ..... *G06Q 30/0275* (2013.01); *G06Q 30/0242* (2013.01); *G06Q 30/0272* (2013.01)

(58) Field of Classification Search
USPC .......................................... 705/14.41, 14.71
See application file for complete search history.

(56) References Cited

U.S. PATENT DOCUMENTS

| 7,231,358 B2 | 6/2007 | Singh et al. |
|---|---|---|
| 9,563,903 B1 | 2/2017 | Haley et al. |
| 2006/0212350 A1 | 9/2006 | Ellis et al. |
| 2007/0162621 A1 | 7/2007 | Condorelli et al. |

(Continued)

OTHER PUBLICATIONS

Pamela Parker, Real-Time Bidding to Come to Facebook Ads, 2012 (Year: 2012).*

(Continued)

*Primary Examiner* — Tarek Elchanti
(74) *Attorney, Agent, or Firm* — Fish & Richardson P.C.

(57) ABSTRACT

A method and system for controlling real-time bidding for online advertisements is disclosed. According to one embodiment, a computer-implemented method comprises communicating with a bidder and an impression server and an event tracking server. The bidder receives a real-time bidding (RTB) request containing an available impression from an exchange and places a bid corresponding to the RTB request. The impression server receives impression requests from a browser and responds to the impression requests from the browser. The event tracking server receives event requests from the browser and responds to event requests from the browser. Campaign performance data is retrieved from one or more of the impression server and the event tracking server and compared to the campaign target. The bidder is notified whether to bid for online advertisement impressions based on the campaign performance data.

18 Claims, 7 Drawing Sheets

(56) References Cited

U.S. PATENT DOCUMENTS

2008/0319890 A1  12/2008  Urbanski et al.
2012/0041816 A1* 2/2012  Buchalter .......... G06Q 30/0242
                                              705/14.71
2014/0040015 A1  2/2014  Haley et al.

OTHER PUBLICATIONS

STIC Search Report for Parent U.S. Appl. No. 13/750,960 (now U.S. Pat. No. 9,501,789) (Year: 2016).
United States Final Office Action, U.S. Appl. No. 13/750,960, 20 pages, dated May 7, 2015.
United States Non-Final Office Action, U.S. Appl. No. 13/565,710, 12 pages, dated Jun. 13, 2013.
United States Non-Final Office Action, U.S. Appl. No. 13/670,448 17 pages, dated Nov. 24, 2014.
United States Non-Final Office Action, U.S. Appl. No. 13/670,448, 8 pages, dated Apr. 1, 2016.
United States Non-Final Office Action, U.S. Appl. No. 13/750,960, 10 pages, dated Mar. 21, 2016.
United States Non-Final Office Action, U.S. Appl. No. 13/750,960, 21 pages, dated Nov. 26, 2014.

\* cited by examiner

HTTP Get:
http://impressions-18/stats

HTTP Response:
```xml
<?xml version="1.0" encoding="UTF-8" ?>
<CampaignStats version="1.0" server="18" start="2012-12-03T20:00:00" end="2012-12-03T21:00:00">
<Campaign id="192" listed="0" served="179" />
<Campaign id="1292" listed="0" served="21" />
<Campaign id="3792" listed="638" served="638" />
<Campaign id="3811" listed="1197" served="1195" />
<Campaign id="5720" listed="19" served="19" />
<Campaign id="6226" listed="89" served="89" />
<Campaign id="6227" listed="49" served="49" />
<Campaign id="7121" listed="660" served="660" />
<Campaign id="7195" listed="4259" served="4241" />
<Campaign id="7343" listed="1298" served="1298" />
<Campaign id="7349" listed="764" served="764" />
<Campaign id="7352" listed="278" served="278" />
<Campaign id="7391" listed="43" served="43" />
<Campaign id="7604" listed="866" served="866" />
<Campaign id="7644" listed="586" served="586" />
<Campaign id="7729" listed="953" served="952" />
<Campaign id="7730" listed="624" served="623" />
<Campaign id="7741" listed="2217" served="2213" />
<Campaign id="7746" listed="159" served="159" />
</CampaignStats>
```

FIG. 7

SYSTEM AND METHOD FOR CONTROLLING REAL-TIME BIDDING FOR ONLINE ADVERTISEMENTS

CROSS-REFERENCE TO RELATED APPLICATIONS

The present application is a continuation of U.S. patent application Ser. No. 15/354,536 filed Nov. 17, 2016, which is a continuation of U.S. patent application Ser. No. 13/750,960 filed on Jan. 25, 2013, which is a continuation-in-part of and claims the benefit of and priority to U.S. patent application Ser. No. 13/565,710 filed on Aug. 2, 2012, which applications are hereby incorporated by reference.

FIELD

The present disclosure relates in general to the field of bidding on advertisement impressions and events, and in particular, to a system and method controlling real-time bidding for online advertisements.

BACKGROUND

An online advertisement impression generally refers to the slot or space on the pages of a website that are available for displaying a single view of an advertisement along with its content. An advertisement event generally refers to active or passive actions that users take in response to an advertisement impression such as clicking an image, expanding an advertisement, or watching a video. Advertisers typically purchase advertisement impressions through bulk contracts directly with publishers. More recently, individual, targeted impressions have become available through real-time bidding (RTB) exchanges such as AdX, Admeld, Pubmatic, Rubicon, etc.

RTB advertising companies are contracted to deliver targeted quantities of advertisements over a period of time. For example, a contract may specify that 3,000,000 advertisements are to be displayed over a 30 day period. Alternatively, the contract may specify some number of events such as 100,000 clicks on the advertisement impressions over the period of time. In a simple scenario, these advertisement impressions are distributed evenly over the 30 day period resulting in a target of 100,000 impressions of that advertisement campaign each day. While many RTB exchanges can meet that requirement, there are other constraints, for example, expandable advertisements are not supported on all web sites or the site may not allow video advertisements longer than 15 seconds. Advertisers may want their advertisement to be displayed on the banner at the top of the page or supply only a few sizes of advertisements, thus limiting the inventory flexibility. Advertisers may also want to protect their brand by restricting the sites where the advertisements are shown. With these restrictions, RTB advertisers examine a vast number of potential impressions to find opportunities to deliver the advertisements.

Once an opportunity is located, an auction takes place with no guarantee that the ad will be purchased. There is no guarantee that similar opportunities will be offered in the future. The selected web sites could become unavailable, layout changes could alter the ad sizes supported, or another company could purchase the available inventory on a domain; therefore, impressions should be located and purchased when available. To handle large advertising campaigns in this uncertain environment, RTB advertisers integrate with multiple RTB exchanges, each of which may host auctions in multiple locations. This results in a continuous stream of impression opportunities at a rate of tens or hundreds of thousands per second. To deal with this flood of bidding opportunities, a geographically distributed set of servers is required to meet the time and scale requirements as described below.

Typical RTB exchanges conduct many thousands of auctions per second. Each auction is a candidate for multiple advertising campaigns. The bidder must determine which campaign, if any, is the best match for the auction. For organizations examining a large fraction of the bid opportunities for multiple advertising campaigns, the workload is beyond the capacity of a single server; therefore, a collection of machines is required to evaluate and respond to the volume of bid opportunities. A RTB control system is required to intelligently manage collections of bidding servers.

RTB auctions require a response within 50-100 milliseconds for a bid to be considered; otherwise, the response is discarded. The time is measured from the exchange's location; therefore, latency is subtracted from the available analysis time. To reduce the intrinsic latency issues, bidders are placed physically close to the exchanges. Since exchanges are located around the world, bidders must be distributed around the world. A RTB control system has to manage bidders that are widely distributed geographically.

For many campaigns, advertisers need to use multiple publishers to reach campaign delivery goals, such as the number of impressions, to deliver within targeting criteria. For example, an advertiser may seek to deliver 100,000 impressions per day to women aged 30 to 45. Since each publisher markets its available impressions through a subset of the RTB exchanges, advertisers are required to integrate with multiple exchanges to deliver each campaign. The RTB control system is required to exercise consolidated campaign delivery control across multiple exchanges.

SUMMARY

A method and system for controlling real-time bidding for online advertisements is disclosed. According to one embodiment, a computer-implemented method comprises communicating with a bidder and an impression server and an event tracking server. The bidder receives a real-time bidding (RTB) request containing an available impression from an exchange and places a bid corresponding to the RTB request. The impression server receives impression requests from a browser and responds to the impression requests from the browser. The event tracking server receives event requests from the browser and responds to event requests from the browser. Campaign performance data is retrieved from one or more of the impression server and the event tracking server and compared to the campaign target. The bidder is notified whether to bid for online advertisement impressions based on the campaign performance data.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 7 illustrates an example web service request to an impression server and a typical response, according to one embodiment.

Figure 1:
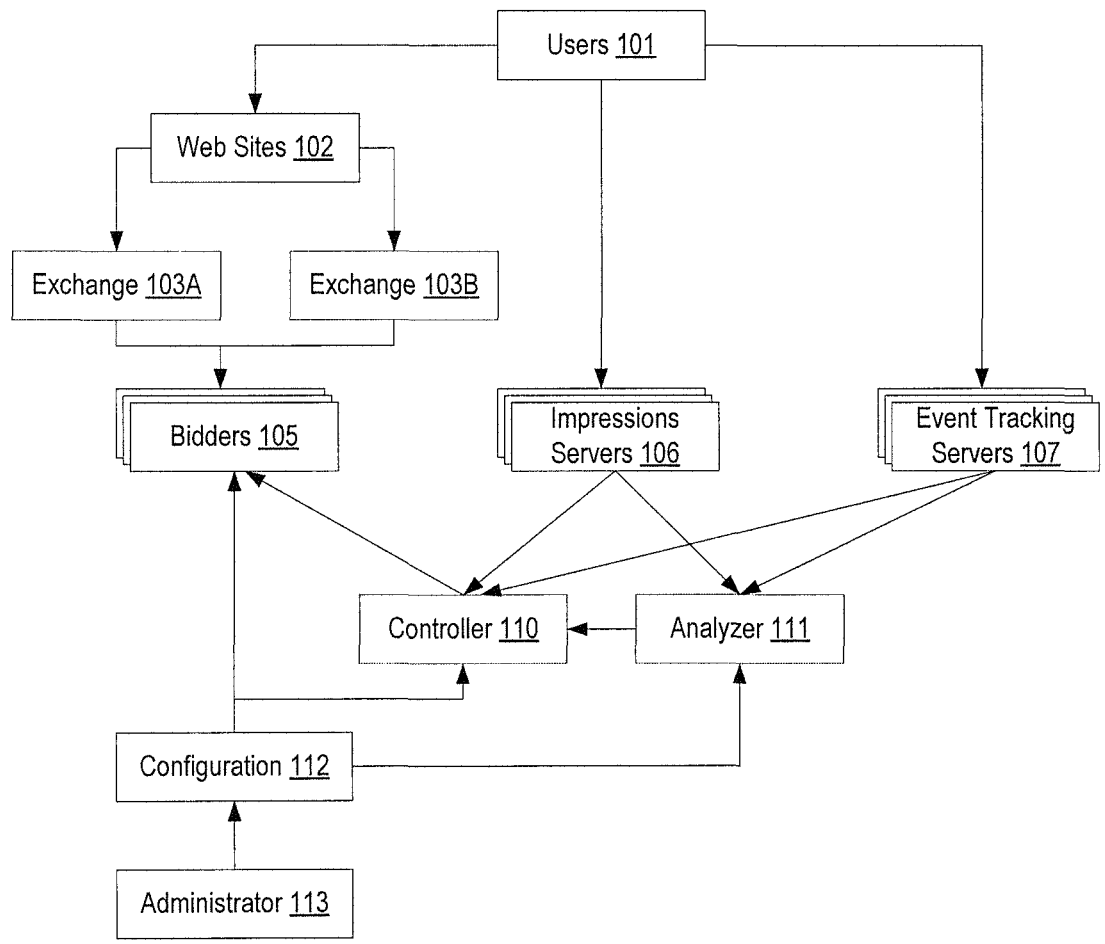
FIG. 1 is a schematic diagram that illustrates a process for controlling real-time bidding for online advertisements, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A method and system for controlling real-time bidding for online advertisements is disclosed. According to one embodiment, a computer-implemented method comprises communicating with a bidder and an impression server and an event tracking server. The bidder receives a real-time bidding (RTB) request containing an available impression from an exchange and places a bid corresponding to the RTB request. The impression server receives impression requests from a browser and responds to the impression requests from the browser. The event tracking server receives event requests from the browser and responds to event requests from the browser. Campaign performance data is retrieved from one or more of the impression server and the event tracking server and compared to the campaign target. The bidder is notified whether to bid for online advertisement impressions based on the campaign performance data.

When a bid is successful, the exchange directs the user's browser to display content by returning a URL pointing to an impression server. The user's browser then accesses the impression server to either retrieve an ad or get redirected to the ad content. A winning bid at the auction is indicated by the user's browser accessing the impression server. When the user takes an action, the event is sent to an event tracker.

According to one embodiment, the present system and method employs a stateless bidding system for real-time bid control. In the stateless bidding system, bidders are unaware whether their bids successfully won impressions or whether the user took any action with respect to their bidding ads. The bidders are also unaware whether other bidders have won impressions for their ad campaigns. The control system gathers this information and notifies bidders whether they should continue bidding for impressions.

In a stateless architecture, the bidding system is able to respond to a request based on campaign parameters without having to gather additional information from elsewhere. In the bidder's context, the stateless architecture means that the bidder is able to respond to a bid request without having to query another system for configuration information or determine the overall state such as the number of impressions that have already been served. The bidder compares input data to pre-loaded configuration information and determines whether to bid for each impression and the price to offer for that impression.

The stateless architecture used by bidders provides high scalability by allowing each bidder to function independently of other components. If bidders share a resource such as a database or shared memory with other systems, servers, or components, the shared resource represents a point of contention that limits scalability. In a stateless architecture, many independent bidding servers can be deployed to share the load without sharing resources. Each bidder operates independently, therefore the system scales linearly with the number of servers deployed. Since bidders are not aware of campaign states, a controller (also referred to as RTB control system) is required to monitor campaign states and notify bidders which campaigns they should bid on. According to one embodiment, a similar stateless architecture is used for other systems such as impression servers and event servers.

Not all events delivered to the impression server are legitimate for ad delivery to users. In some cases, duplicate requests may be generated. Some impressions are generated for testing purposes, and Web crawlers retrieve URL content for analysis. Similar issues occur when monitoring other metrics such as mouse clicks, ad expansion, and video starts from users who are served ad content. Therefore, analysis is required to remove false data. An RTB control system must manage bidders intelligently with imperfect knowledge about the current state of the overall bidding system.

Each winning bid incurs a cost. While each impression is inexpensive, there are many thousands of impressions available for each second. Therefore, an RTB control system has to respond rapidly to stop bidding once the impression target is met; otherwise, the purchaser may spend a great deal of money buying more impressions than contracted with their client. This overage is a cost to the purchaser, and it cannot be passed along to clients.

Advertising contracts specify a minimum number of impressions to be served. If the supplier is unable to deliver the required impressions, the advertiser may enforce penalties. The RTB control system has to guarantee that the minimum impressions are delivered while minimizing the overage cost.

An RTB control system is a critical component of a complex infrastructure. The RTB control system must coordinate a distributed collection of stateless bidders, impression servers, and event servers that operate across multiple campaigns and exchanges. The RTB control system is required to respond quickly based on initial and/or imperfect information to avoid excessive overage costs. The RTB control system adjusts as false data is identified and corrected in order to achieve the committed goals.

The present system and method disclosed herein allows advertisers to bid on advertisement requests across multiple RTB exchanges in a coordinated manner while reaching the target goals of multiple advertising campaigns.

DEFINITIONS

Administrator—a person who sets the desired system behavior.

Analyzer—a system that removes false data gathered by impression servers, event trackers, and other components.

Bidder—a system designed to respond to opportunities advertised by RTB exchanges.

Event Tracker—a system to monitor user events such as mouse clicks, ad expansion, video start, video end, etc.

Configuration—a desired system behavior and supplemental information required to achieve the system behavior such as targeting information, pricing, lists of crawlers and test clients.

Controller—a system to control bidding on the various exchanges.

Impression server—a system designed to deliver content when notified of winning bids.

It is noted that the present systems are logical systems such that a single piece of hardware can support multiple tasks or multiple pieces of hardware may be required to perform the logical function.

FIG. 1 is a schematic diagram that illustrates a process for controlling real-time bidding for online advertisements, according to one embodiment. Each bidder 105 is connected to one or more RTB exchanges 103 to compete for available impressions for delivery to users 101. These bidders may be physically located near the target RTB exchanges' 103 calling servers to reduce network latency. Each available impression is compared against the currently active campaigns to determine whether to attempt to purchase that impression. Control system 110 is responsible for enabling/disabling bidding on campaigns running across multiple bidders 105 and adjusting campaign parameters such as the bid price as required in order to reach the target impression or event quota.

For performance and scalability, the present system and method employs a stateless architecture. In a stateless architecture, the server responds to requests without exchanging information with other systems, servers, and/or components. Each bidder loads information about campaigns that it is executing on a specific RTB exchange or exchanges. This information includes campaign parameters such as web domains, content filters, and pricing information. Since the bidders have the information they need to respond to requests, they quickly respond to the requests. Additional bidders can be deployed as required since they operate independently. With this stateless design, each bidder achieves desired performance, and the number of bidders can be increased for scalability.

While this stateless architecture is good for scalability, it introduces a dependency on controller 110 to regulate the bidders 105. Each bidder 105 is unaware of how many impressions have been served for the campaign, how many other bidders 105 are engaged on the campaign, which exchanges are used to deliver the campaign, or whether any bid is successful. Controller 110 monitors campaign delivery to decide whether to enable or disable each campaign on each bidder 105.

Bidders 105 rely on the controller 110 for direction on which campaigns should be enabled or disabled. Controller 110, along with other components of FIG. 1, defines a desired behavior such that bidders 105 stop bidding for impressions if the controller 110 fails or loses the ability to communicate with the bidders 105. Without this failsafe mechanism in the communication protocol between controller 110 and bidders 105, each bidder 105 would continue to bid on impressions indefinitely. This represents a potentially unlimited expenditure for acquiring impressions; therefore, bidders 105 require a backup system to limit their potential expenditures. In a preferred embodiment, bidders 105 default to disable all bidding of the communication failure occurs. The controller 110 periodically sets a timer on the bidder 105 to allow bidding during a controller-configurable time, for example ten minutes, through a messaging protocol. If the bidder 105 does not hear from the controller 110 before the timer expires, the bidder 105 stops bidding on all campaigns. Other bidders may continue bidding while the specific bidder is idle. The controller 110 re-enables bidder 105 to bid for impressions for active campaigns with the next control message.

When a bid is won through an auction, impression servers 106 provide content or instructions on how to retrieve the content. When users 101 take an action such as clicking on an ad or starting a video, that information is sent to event tracking servers 107. Impressions server 106 and event tracking server 107 maintain information about users' actions for each campaign.

Bidders 105 spend money for each auction that they win. With many thousands of auctions available each second, the cost of bidding quickly adds up. The controller 110 manages bidding quickly and accurately to meet committed impression goals while avoiding buying unnecessary impressions.

Controller 110 gathers configuration parameters 112 about campaigns. Controller 110 analyzes information from impressions servers 106 and event tracking servers 107 to roughly monitor campaign performance for bidders 105, impression servers 106, and event tracking servers 107. This provides a quick estimate of campaign performance regardless of exchange or location that is used to determine whether to continue bidding on campaigns. Messages and/or instructions are sent immediately to each bidder 105 to enforce the bidding decisions.

According to one embodiment, impression servers 106 and event tracking servers 107 maintain in a cache the number of impressions or events for each campaign returned by that server. The cache is kept small; impression servers 106 maintain only campaign IDs and impression counts, and event tracking servers 107 maintain the campaign ID and various event counts. Since the data is not stored to a disk, the counts are updated quickly when new impressions are served or events are triggered. The data is quickly retrievable when needed because 1) there is a small amount of data, 2) the data is cached, and 3) the protocol is efficient. The protocol is efficient in that there is a small amount of overhead to using web services while transmitting a large amount of information. A typical request and response from one embodiment are shown in FIG. 7.

According to one embodiment, the controller 110 queries current campaign performance in realtime directly from the impression servers 106 and event tracking servers 107 using Web services. Web services provide a low-overhead, standards-based, reliable mechanism to retrieve data over a Wide Area Network (WAN), allowing impression servers 106 and event tracking servers 107 to be located anywhere on the network. Web services use the standard HTTP protocol, which in turn uses the TCP/IP protocol. TCP/IP has built-in support for packetizing data, reliable routing, and automatic retransmission of lost data packets. Web services allow RTB controller 110 to maintain reliable communication with the bidders 105, impression servers 106, and event tracking servers 107.

The controller 110 aggregates the data and compares the result to the campaign target. When the campaign target is reached, the controller 110 uses web services to notify bidders 105 which campaigns are to be started, continued or stopped. This approach limits the cost overages due to buying unnecessary impressions.

The cache is cleared when the bidder 105, impression server 106, or event tracker 107 is restarted; however, it is not necessarily cleared at a specific time. Therefore, the real-time controller 110 computes the change in impressions and events from one query to the next and detects when a restart has occurred. A restart is detected by comparing the current counter value to the previous value. If the new value is less than the previous value, a reset has occurred. Since there is no way to determine the counter at the time of the reset, the current counter value is the best estimate for the difference since the last time the counter was read. If a reset has not occurred, the difference is the current value minus the previous value. To determine campaign performance for the day, the difference values since midnight are summed.

According to one embodiment, the controller 110 compares daily performance to the daily target performance. If the daily target is reached, the controller 110 uses web services to send a message to the bidder 105 to stop bidding for advertisement impressions for the campaign. To conserve bandwidth, commands for multiple campaigns are packed into a single message and incremental updates are sent to bidders 105 when possible. An incremental update message contains the time to continue bidding, a list of campaigns to start or stop, and a checksum. Each bidder 105 creates a temporary list of campaigns that are to be enabled and calculates a checksum on the list. If the calculated checksum matches the checksum in the message, the bidder 105 replaces its current list of enabled campaigns with the updated list and sets its bidding expiration time to the value in the message. Regardless whether the checksums match, the bidder 105 returns a message with its calculated checksum. The controller 110 compares the returned checksum to the checksum that the bidder 105 sent. If the values do not match, the controller 110 transmits a full update message of campaigns and the current state of each campaign. The full update message contains a time to continue bidding, a full list of campaigns to bid or not bid, and a checksum. The full list is required on the rare conditions when the entire list has changed or the bidder 105 and controller 110 are out of sync.

Figure 3:
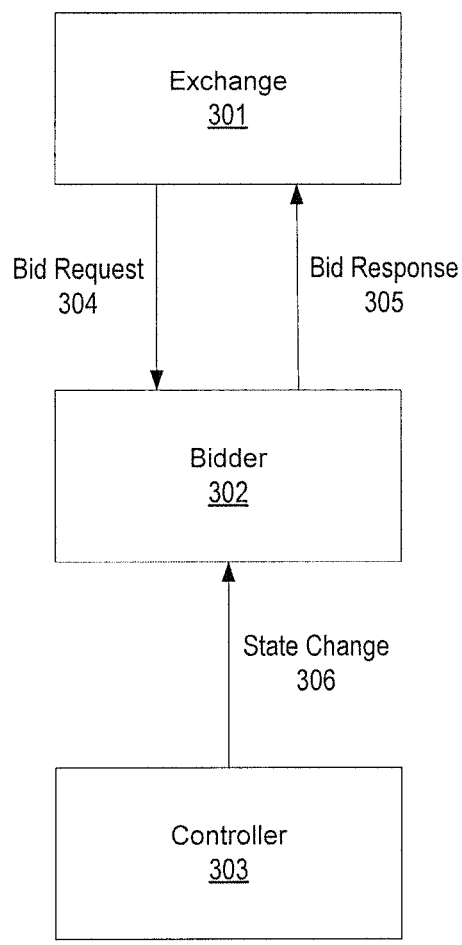
FIG. 3 illustrates an exemplary stateless bidding server architecture that may be used for the present system, according to one embodiment.

According to one embodiment, each bidder 105 maintains a copy of enabled campaigns and their configuration information on each campaign. The configuration information is used by the bidder 105 to respond to bid requests from an exchange as shown in FIG. 3. The configuration information contains information including allowable domains, target prices, and supported ad sizes, etc. At startup, the bidder 105 loads the current campaign configurations, but leaves the list of enabled campaigns empty. The first message from the controller 110 results in a mismatch between the enabled campaign list on the bidder 105 and the controller 110. The controller 110 detects the mismatch using checksums and performs a full update on the enabled campaign list. Since the configuration is pre-loaded on the bidder 105, campaigns can be enabled and disabled quickly in response to messages from the controller 110.

Web crawlers, system tests, and duplicate events generate false impressions and events. All these actions are reported to impression servers 106, event tracking servers 107, and other components of the control system 110. Analyzer 111 gathers and scrubs impression and event information across bidders 105, impression servers 106, and event tracking servers 107 to remove false data and to correctly assess campaign performance. The analysis to clean false data may require some time to complete. For example, a web crawler might be detected by examining traffic patterns in log files over time across impression servers 106. Multiple clicks by a single user can also be detected by analyzing a combined set of log files. Once these types of issues are detected, adjustments are made to the delivery statistics of the campaign. Since these data are not immediately available, control system 110 works with imperfect information, at least temporarily. The present controller architecture operates with the information available at the time of analysis, and then adjusts as more data becomes available.

Controller 110 uses the adjusted information received from analyzer 111 to improve the initial estimate of the number of impressions and events delivered for each campaign. Based on the adjusted information, controller 110 may resume or suspend bidding on various campaigns to reach the target. In this way, controller 110 reacts quickly to manage bidding based on the best information available at the time and then issues corrections as more information becomes available. Campaign targets are reliably reached without resorting to measures such as buying large quantities of surplus impressions as a hedge against false data. This approach achieves the targets while minimizing overhead due to unbillable impressions.

According to one embodiment, the present system and method is scalable to control high auction volume across multiple exchanges and locations in a coordinated and consistent manner. Waste is reduced by pausing campaigns quickly once targets are approximately reached. Ad delivery is fine-tuned as more accurate information is available to ensure correct campaign delivery. Web services are used to provide fast yet reliable notification across a widely distributed collection of bidding servers. Log files are gathered and examined to fine tune performance with adjustments applied using web services.

Figure 2:
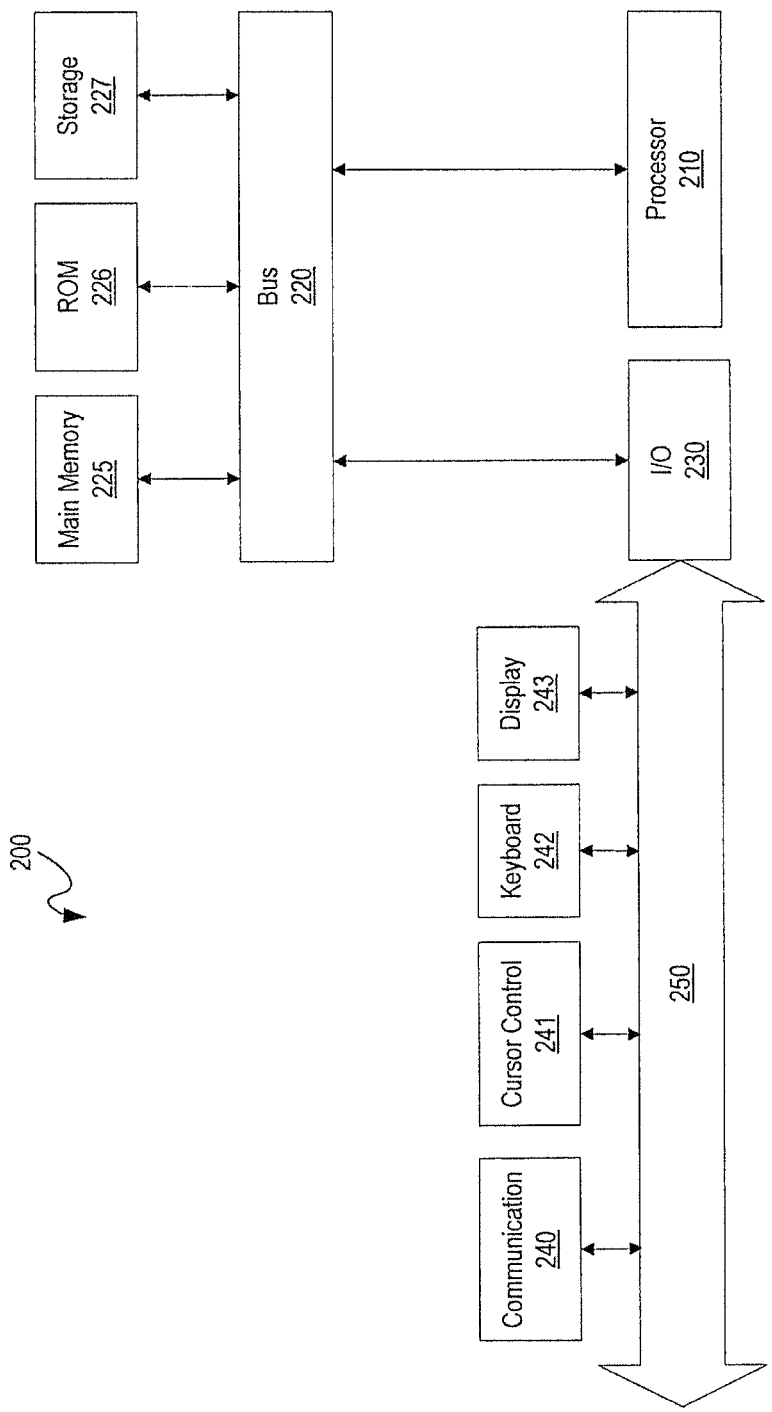
FIG. 2 illustrates an exemplary computer architecture that may be used for the present system, according to one embodiment.

FIG. 2 illustrates an exemplary computer architecture that may be used for the present system, according to one embodiment. The exemplary computer architecture may be used for implementing one or more components described in the present disclosure including, but not limited to, the present system. One embodiment of architecture 200 comprises a system bus 220 for communicating information, and a processor 210 coupled to bus 220 for processing information. Architecture 200 further comprises a random access memory (RAM) 225 (referred to herein as main memory) or other dynamic storage device 227, coupled to bus 220 for storing information and instructions to be executed by processor 210. Main memory 225 also may be used for storing temporary variables or other intermediate information during execution of instructions by processor 210. Architecture 200 may also include a read only memory (ROM) and/or other static storage device 226 coupled to bus 220 for storing static information and instructions used by processor 210.

A data storage device 227 such as a magnetic disk or optical disc and its corresponding drive may also be coupled to architecture 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). The communication device 240 allows for access to other computers (e.g., servers or clients) via a network. The communication device 240 may comprise one or more modems, network interface cards, wireless network interfaces or other interface devices, such as those used for coupling to Ethernet, token ring, or other types of networks.

FIG. 3 illustrates an exemplary stateless bidding server architecture, according to one embodiment. An exchange 301 sends a bid request 304 to bidder 302. Bidder 302 has sufficient information to evaluate the request 304 and return a bid response 305 without having to query other servers such as a database, other bidders, or the controller. Bidder 302 is unaware of other bidders, impression servers, or event servers. Controller 303 is responsible for monitoring campaign performance. Controller 303 sends a state change message 306 to bidder 302 to start or stop bidding on a campaign.

Figure 4:
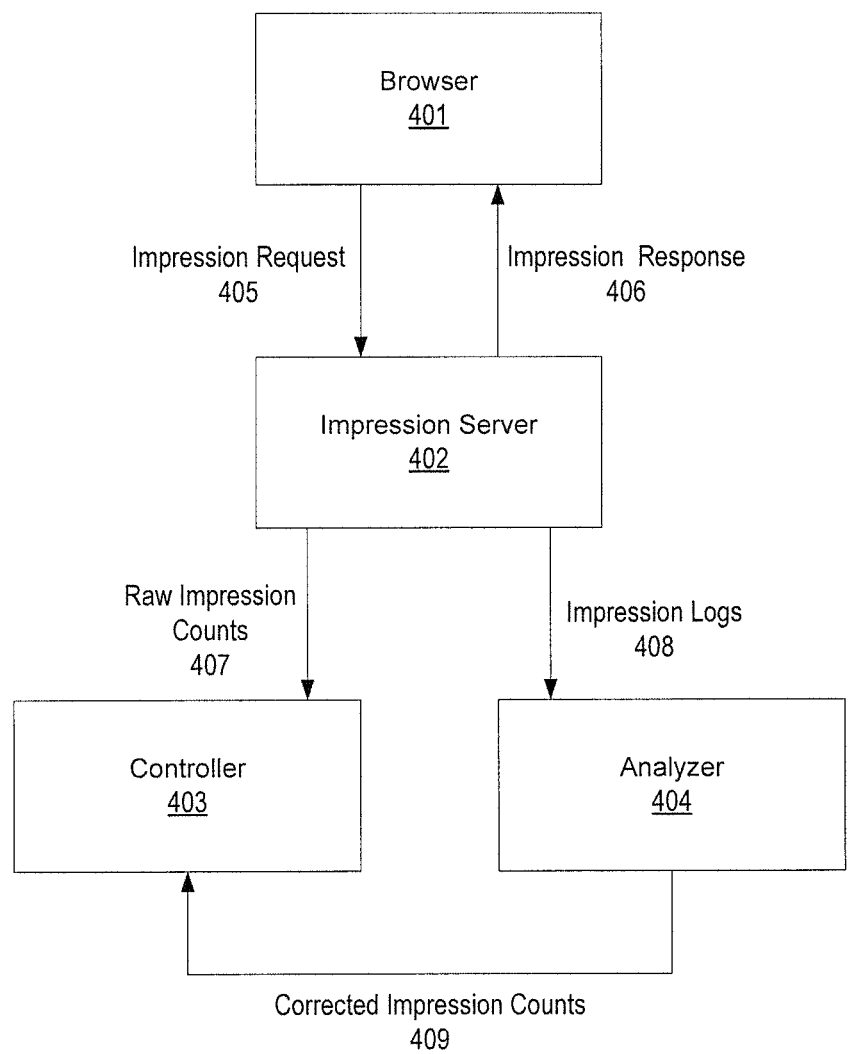
FIG. 4 illustrates an exemplary stateless impression server architecture that may be used for the present system, according to one embodiment.

FIG. 4 illustrates an exemplary stateless impression server architecture, according to one embodiment. Browser 401 sends an impression request 405 to impression server 402 for the online campaign ad for a winning RTB bid. Impression server 402 has sufficient information to evaluate the request 405 and return impression response 406 without having to query other servers such as a database, other impression servers, or the controller. Impression server 402 is unaware of other bidders, impression servers, or event servers. Controller 403 is responsible for monitoring campaign performance. Analyzer 404 is responsible for analyzing impressions to remove duplicates, test impressions, fraudulent information and other unwanted data from the impression stream. Analyzer 404 retrieves logs 408 from multiple impression servers 402 and removes unwanted impressions. Controller 403 retrieves the corrected impression counts 409 from analyzer 404. Since analyzer 404 processing results in a delay in receiving accurate impression counts 409, controller 403 queries the impression servers 402 to retrieve approximate impression counts for the delay window.

Figure 5:
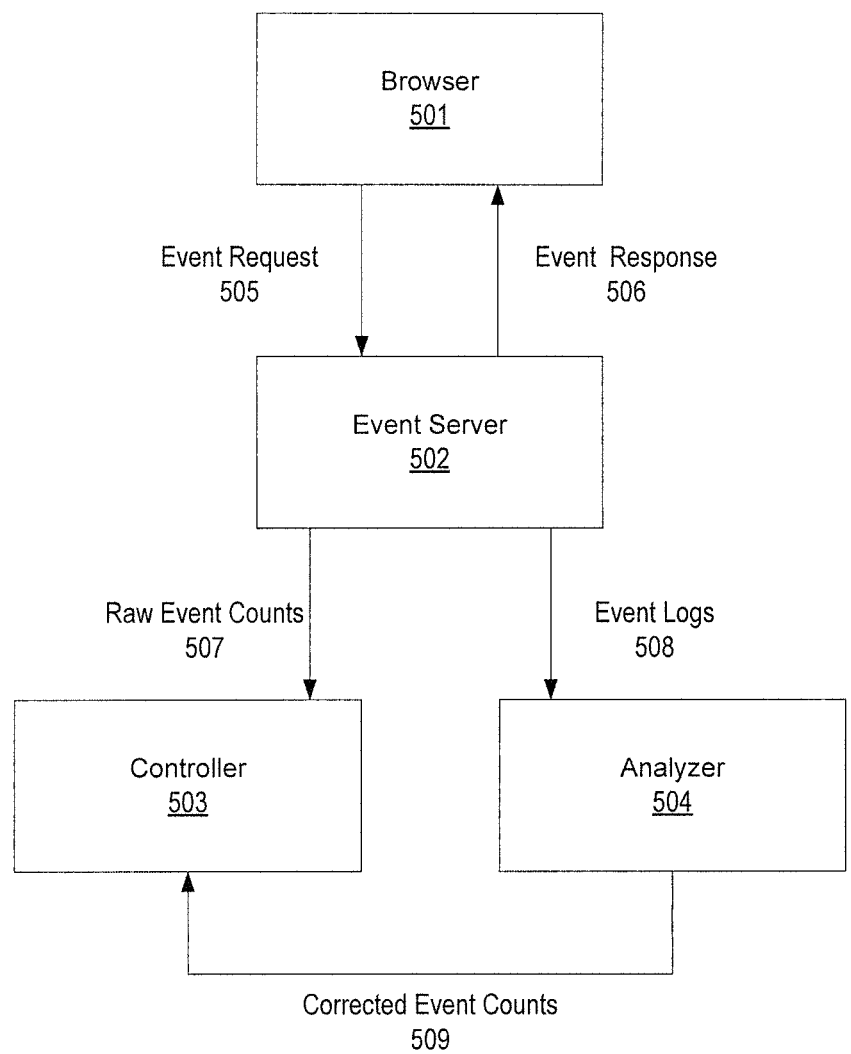
FIG. 5 illustrates an exemplary stateless event server architecture that may be used for the present system, according to one embodiment.

FIG. 5 illustrates an exemplary stateless event server architecture, according to one embodiment. Browser 501 sends an event request 505 to event server 502 to notify event server 502 of an action such as clicking on an ad, watching a video, or signing up for an offer. Event server 502 has sufficient information to evaluate the event request 505 and return event response 506 without having to query other servers such as a database, other event servers, or the controller. Event server 502 is unaware of other bidders, impression servers, or event servers. Controller 503 is responsible for monitoring campaign performance. Analyzer 504 is responsible for analyzing event requests to remove duplicates, test requests, fraudulent information and other unwanted data from the impression stream. Analyzer 504 retrieves event logs 508 from multiple event servers 502 and removes unwanted events. Controller 503 retrieves the corrected event counts 509 from analyzer 504. Since analyzer 504 processing results in a delay in receiving accurate event counts 509, controller 503 queries the event servers 502 to retrieve approximate event counts for the delay window.

Figure 6:
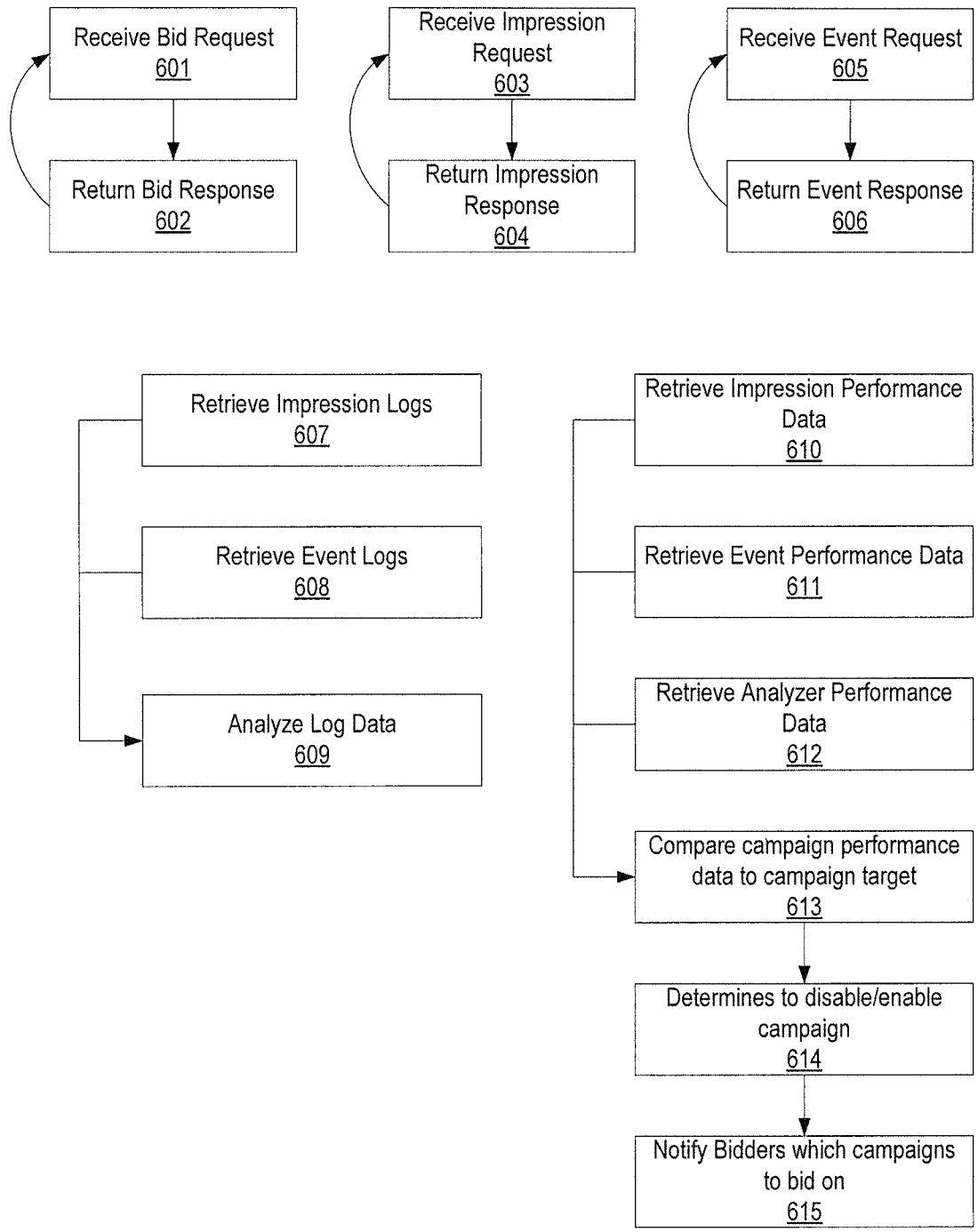
FIG. 6 illustrates an exemplary process for placing bids, responding to impression requests, and responding to event requests for an online advertisement campaign, according to one embodiment.

FIG. 6 illustrates an exemplary process for placing an online advertisement campaign, according to one embodiment. Bidder 105 receives a real-time bidding (RTB) request from an exchange 103 (601). The RTB request contains an advertisement campaign target. Bidder 105 places a bid corresponding to the RTB request (602).

If bid response (602) is the winning bid, the user's browser 101 sends an impression request to impression server 106 (603). Impression server 106 returns a response to the impression request to the browser (604).

When the user takes selected actions, such as clicking on an advertisement or starting a video, or an automated event occurs, such as a video completes, the browser sends an event request to event tracking server 107 (605). The event tracking server 107 returns a response to the event request to the browser (606).

Analyzer 111 retrieves impression logs from impression servers (607) and event logs from event tracking servers 107 (608), and analyzes the log data (609) to generate analyzer performance data.

Controller 110 periodically requests campaign performance data generated by impressions servers 106 (610) and/or event tracking servers 107 (611), and and/or analyzer 111 (612). Controller 110 keeps monitoring the real-time campaign performance of the online advertisement campaign using the campaign performance data. Controller 110 compares the campaign performance data to the campaign targets (613), and determines whether to enable or disable each online advertisement campaign based on the result of the comparison (614). Controller 110 signals the bidding servers 105 to stop bidding for impressions for online advertisement campaigns that have reached their targets and to bid for impressions for online advertisement campaigns that have not yet reached their targets (615).

FIG. 7 illustrates an example web service request to an impression server and a typical response, according to one embodiment. Impression servers 106 and event tracking servers 107 maintain log and performance data in a cache to serve controller 110 when requested. Since impression servers 106 maintain only campaign IDs and listed and served impression counts, the data sent to controller 110 is kept small. Similarly, event tracking servers 107 maintain the campaign ID and various event counts. In response to a HTTP request, HTTP response contains only a small amount of overhead such as version information for data type (e.g., xml version), campaign stat, and server ID, the log period (e.g., start and stop time).

A system and method for controlling real-time bidding for online advertisements has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A system for real-time configuration of in-use servers in a distributed computing environment, the system comprising:
   a controller server comprising one or more processors and computer memory, the controller configured to transmit state-change messages to each of a plurality bidding servers to instruct each bidding server to transition state; and
   a plurality of bidding servers each comprising one or more processors and computer memory, each bidding server configured to perform operations including:
      (a) maintain data that defines bidding operations for the bidding server to execute;
      (b) communicably couple to at least one bidding exchange service;
      (c) communicably couple to the controller server;
      (d) receive bid-request messages from the at least one bidding exchanges services;
      (e) operate in an enabled mode, the enabled mode comprising operating on the received bid-request messages according to the data that defines bidding operations for the bidding server to execute in order to selectively transmit bid responses to the bidding exchange service;

(f) operate in a disabled mode, the disabled mode comprising refraining from transmitting bid requests to the bidding exchange service;
(g) transition between the enabled mode and the disabled mode in response to receiving state-change messages from a controller server; and
(h) determine that communication with the controller server has been interrupted and responsively transition from the enabled mode to the disabled mode wherein the control server is further configured to provide timer values to each of the plurality of bidding servers; and wherein, to determine that communication with the controller server has been interrupted, each bidding server is further configured to perform operations including:
(i) maintain a timer set to the most recent received timer value from the control server;
(j) determine that the timer has expired with no state-change message received since the start of the timer; and
(k) responsive to determining that the timer has expired with no state-change message received since the start of the timer, transition from the enabled mode to the disabled mode.

2. The system of claim 1, wherein each bidding server is configured to receive the bid requests only when in the enabled mode.

3. The system of claim 1, wherein the state-change messages have an enable-type and a disable-type message to instruct the bidding server to transition to the enabled mode and to transition to the disabled mode, respectively.

4. The system of claim 1, wherein the system further comprises:
an impression server comprising one or more processors and computer memory, the impression server configured to perform operations including:
(k) receive an impression request corresponding to a bid made by a bidding server that has been accepted by the bidding exchange service;
(l) respond to the impression request;
(m) maintain a count of responses to impression requests without storing the count of responses to impression requests to a disk different from the computer memory; and
(n) provide the count of response to impression requests to the controller server.

5. The system of claim 4, wherein, to maintain a count of responses to impression requests, the impression server is configured to store the count in a fast-access cache and not to a lower-access disk.

6. The system of claim 4, wherein to respond to the impression request, the impression server returns a content item in response to receiving the impression request.

7. The system of claim 4, wherein to respond to the impression request, the impression server returns a redirect-message in response to receiving the impression request, the redirect-message comprising an address to a content item stored by hardware separate from the impression server.

8. A method for real-time configuration of in-use servers in a distributed computing environment, the method comprising:
transmitting state-change messages from a controller server to each of a plurality bidding servers to instruct each bidding server to transition state;
maintaining, by each of the bidding servers, a plurality of bidding campaigns, each bidding campaign including data that defines bidding operations for the bidding server to execute;
communicably coupling, by each of the bidding servers, to at least one bidding exchange service;
communicably coupling, by each of the bidding servers, to the controller server;
receiving, by each of the bidding servers and bid-request messages from the at least one bidding exchanges services;
entering an enabled mode by each of the bidding servers, the enabled mode comprising operating on the received bid-request messages according to the data that defines bidding operations for the bidding server to execute in order to selectively transmit bid responses to the bidding exchange;
entering a disabled mode by each of the bidding servers, the enabled mode comprising refraining from transmitting bid requests to the bidding exchange service;
transitioning by each of the bidding servers between the enabled mode and the disabled mode in response to receiving state-change messages from a controller server; and
determining, by each of the bidding servers, that communication with the controller server has been interrupted and responsively transition from the enabled mode to the disabled mode comprising:
maintaining a timer set to the most recent received timer value from the control server; and
determining that the timer has expired with no state-change message received since the start of the timer; and
responsively to determining that the timer has expired with no state-change message received since the start of the timer, transitioning from the enabled mode to the disabled mode.

9. The method of claim 8, wherein each bidding server is configured to receive the bid requests only when in the enabled mode.

10. The method of claim 8, wherein the state-change messages have an enable-type and a disable-type message to instruct the bidding server to transition to the enabled mode and to transition to the disabled mode, respectively.

11. The method of claim 8, the method further comprising:
receiving, by an impression server, an impression request corresponding to a bid made by a bidding server that has been accepted by the bidding exchange service;
responding, by the impression server, to the impression request;
maintaining, by the impression server, a count of responses to impression requests without storing the count of responses to impression requests to a disk; and
providing, by the impression server, the count of response to impression requests to the controller server.

12. The method of claim 11, wherein to maintain a count of responses to impression requests, the impression server is configured to store the count in a fast-access cache and not to a lower-access disk.

13. The method of claim 11, wherein to respond to the impression request, the impression server returns a content item in response to receiving the impression request.

14. The method of claim 11, wherein to respond to the impression request, the impression server returns a redirect-message in response to receiving the impression request, the redirect-message comprising an address to a content item stored by hardware separate from the impression server.

15. A non-transitory computer-readable medium storing instructions that, when executed by one or more processors, cause the processors to perform operations comprising:

transmitting state-change messages from a controller server to each of a plurality bidding servers to instruct that bidding server to transition state;

maintaining, by each of the bidding servers, a plurality of bidding campaigns, each bidding campaign including data that defines bidding operations for the bidding server to execute;

communicably coupling, by each of the bidding servers, to at least one bidding exchange service;

communicably coupling, by each of the bidding servers, to the controller server;

receiving, by each of the bidding servers and from the bidding exchanges services, bid-request messages;

entering an enabled mode by each of the bidding servers, the enabled mode comprising operating on the received bid-request messages according to the data that defines bidding operations for the bidding server to execute in order to selectively transmit bid responses to the bidding exchange;

entering a disabled mode by each of the bidding servers, the enabled mode comprising refraining from transmitting bid requests to the bidding exchange service;

transitioning by each of the bidding servers between the enabled mode and the disabled mode in response to receiving state-change messages from a controller server; and determining, by each of the bidding servers, that communication with the controller server has been interrupted and responsively transition from the enabled mode to the disabled mode comprising:

maintaining a timer set to the most recent received timer value from the control server; and determining that the timer has expired with no state-change message received since the start of the timer; and responsively to determining that the timer has expired with no state-change message received since the start of the timer, transitioning from the enabled mode to the disabled mode.

16. The medium of claim 15, wherein to maintain a count of responses to impression requests, an impression server is configured to store the count in a fast-access cache and not to a lower-access disk.

17. The medium of claim 15, wherein to respond to the impression request, the impression server returns a content item in response to receiving the impression request.

18. The medium of claim 15, wherein to respond to the impression request, the impression server returns a redirect-message in response to receiving the impression request, the redirect-message comprising an address to a content item stored by hardware separate from the impression server.

* * * * *